April 25, 1961 E. M. ZIOLKOWSKI 2,981,934

ELECTRICAL APPARATUS FOR TRANSFERRING DIGITAL DATA

Filed March 13, 1957 2 Sheets-Sheet 1

INVENTOR.
EDWARD M. ZIOLKOWSKI

BY Henry L. Hanson

ATTORNEY.

April 25, 1961 E. M. ZIOLKOWSKI 2,981,934

ELECTRICAL APPARATUS FOR TRANSFERRING DIGITAL DATA

Filed March 13, 1957 2 Sheets-Sheet 2

INVENTOR.
EDWARD M. ZIOLKOWSKI
BY Henry L. Hanson
ATTORNEY.

2,981,934

ELECTRICAL APPARATUS FOR TRANSFERRING DIGITAL DATA

Edward M. Ziolkowski, Waltham, Mass., assignor, by mesne assignments, to Minneapolis-Honeywell Regulator Company, a corporation of Delaware Filed Mar. 13, 1957, Ser. No. 645,839
8 Claims. (Cl. 340—174)

A general object of the present invention is to provide a new and improved electrical circuit used for storing and manipulating digital data. More specifically, the present invention is concerned with a new and improved circuit utilizing bistable magnetic cores as the active elements for storing and manipulating data where the circuits are characterized by their freedom from unwanted signals and noise as the circuit is being operated.

Magnetic core circuits, particularly those using cores having a bistable characteristic, are well adapted for the handling of the various logical functions useful in digital handling circuits. In an article entitled, "Logical and Control Functions Performed with Magnetic Cores," by S. S. Guterman, et al., from the Proceedings of the I.R.E., volume 43, Number 3, March 1955, there are disclosed several forms of magnetic core circuits useful in performing logical functions with respect to digital data where the digital data takes the form of electrical impulses. These circuits use bistable elements arranged in a single core per bit configuration with RC delay circuit coupled between cores. When a core having a preassigned digit, such as a "one," stored therein is shifted, the resultant signal is read out from the core into the associated delay circuit and is then propagated through the delay circuit into the next core. The signal propagated into the next core circuit may be stored there or the reading into the subsequent core may be inhibited by a signal from a further core circuit to thereby perform a predetermined logical function. The circuits of the type disclosed in the foregoing article are satisfactory under closely controlled conditions involving the matching of the core elements as well as the other components interconnecting the cores. In the absence of a well balanced system in a single core per bit configuration, it is difficult to perform extensive logic without undue interference from unwanted signals which may be termed noise.

As the matching of core elements and components is difficult to achieve on anything but a limited or laboratory type basis for digital computer logical circuits, it is necessary that provision be made for selecting cores on a less critical basis. The present invention is directed to circuit improvements which permit the circuitry to function effectively in a logical configuration without undue interference from noise even though the core selection is not closely controlled.

It is accordingly a more specific object of the present invention to provide a new and improved magnetic core logical circuit of the single core per bit type utilizing circuit elements which will minimize the effects of noise even though the core elements are not critically selected.

Bistable magnetic cores have what is frequently termed rectangular hysteresis characteristics. Practically speaking, however, the hysteresis characteristic is not a perfect rectangle but is rather a parallelogram whose saturation portions, sometimes referred to as domain walls, do not run parallel to the major axis of the B—H curve of the core. When the core is in a particular bistable state, and a shift pulse is applied to the core by an input winding tending to maintain the core in that bistable state, there is nevertheless a variation of the flux in the core due to the fact that the flux is changing since the characteristic is not parallel to the major axis of the characteristic. This flux change will produce an output signal in an output winding wound on the core. This output signal is unwanted if the core was already in the state toward which the shift pulse was going to shift the core. Consequently, since the signal is an unwanted signal it is necessary that some means be provided for gating this signal out of the associated delay line to eliminate any tendency for the signal to propagate through the delay line and thereby put an unwanted signal into a subsequent core.

It is accordingly a more specific object of the present invention to provide a new and improved bistable core circuit having a delay line coupled to the output thereof wherein a gating means is provided on the input of the delay line to eliminate a signal generated in the output winding due to a shift pulse driving the core in the direction in which it is already saturated.

The signal produced by a shift pulse tending to drive the core into the saturated state at which it is already set is sometimes referred to as the "zero" signal. When the core is switched in the opposite direction so that the saturated state is reversed, this will result in a relatively large output signal in the output winding and this signal will include a portion of the signal resulting from a movement of the flux in the saturated portion of the core characteristic. Any circuit which tends to eliminate the "zero" signal resulting from the application of a shift pulse will inherently tend to eliminate a portion of a signal produced by a changing of the core from one bistable state to the other bistable state. Any gating circuitry associated with the core link must inherently minimize the effect on a change of the core from one state to the other while effecting a maximum cancellation or discrimination against a "zero" signal in the output winding originating from the application of a shift pulse to the core when the core state is not changed.

As the frequency components of the "zero" signal in the output winding are somewhat different from the frequency components of a "one" output signal it is possible to use a frequency discrimination circuit to function as a gating means on the input of the delay coupling link.

It is therefore a further more specific object of the present invention to provide a new and improved coupling link for a bistable magnetic core circuit wherein said coupling link has on the input thereof a frequency discriminating circuit which is adapted to eliminate undesired signals from the delay circuit.

Another more specific object of the present invention is to provide a delay link between a pair of bistable magnetic cores where the delay link has on the input thereof a diode and an inductor arranged in a signal discriminating configuration to effectively cancel out the initial portion of any output signals originating in the output winding of a core having a shift pulse applied thereto.

The problem of unwanted signal rejection is present not only at the input of the delay line coupling link but also at the output thereof. As accomplished by the present invention, the coupling link output has been so arranged that the back flow of current into the delay line from a core which is shifted is minimized and the forward flow of a signal from the delay line into the input winding of a core is controlled so that there is a much sharper switchover when a pulse is read into a core. This improved characteristic is achieved by a coupling arrangement of elements on the output of the delay line with a diode and a resistor functioning as the main elements to achieve the desired circuit characteristic. The desired relationship is accomplished by selectively choosing a diode having a relatively high breakdown resistance and a relatively low conductivity in combination with a resistor of a desired magnitude which causes an input pulse propagating toward an input winding to initially see a relatively high resistance and then a lower resistance upon the diode moving into its more conductive region.

It is therefore a still more specific object of the present invention to provide an improved output circuit for a delay line coupling link between a pair of magnetic cores having a non-linear impedance variable in accordance with the signal amplitude in the coupling link.

It will be readily apparent that the non-linear characteristic of this output circuit will further enhance the ability of the coupling link to reject unwanted signals originating in the delay line or the input thereof.

A further more specific object of the present invention is to provide an output circuit for a delay line coupling link comprising a non-linear asymmetrically conducting device having a resistor connected in circuit therewith to shift the point at which an input signal will be effective to switch the succeeding core fed by the delay line.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Of the drawings:

Figure 1 is a schematic showing of a single core per bit logical circuit utilizing one form of the novel features of the present invention;

Figure 2:
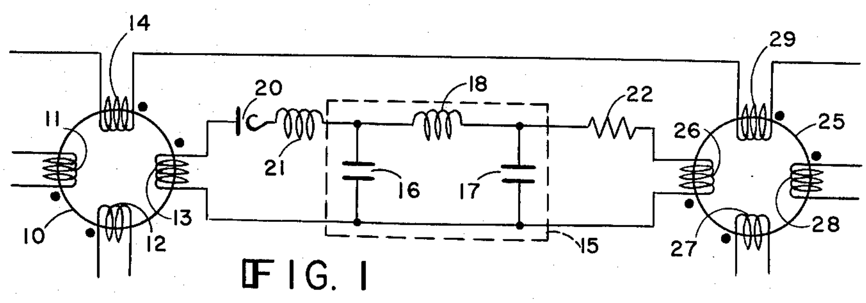
Figure 2 illustrates a representative B—H curve for a magnetic core of the type used with the present invention.

Referring now to Figure 1, the numeral 10 represents a magnetic core which is used as a digital manipulating or storing element. The core 10 is composed of a material which has a rectangular type hysteresis characteristic as illustrated by the B—H curve of Figure 2. Wound upon the core 10 are a pair of input windings 11 and 12, an output winding 13 and a shift winding 14. Coupled to the output winding is a delay link 15 comprised of a pair of condensers 16 and 17 with a choke 18 connected therebetween. Connected to one input terminal of the delay link 15 is a diode 20 and a choke coil 21. Connected in series with the output of the link 15 is a resistor 22. The output of the delay link 15 feeds into a further magnetic core element 25 having an input winding 26, a further input winding 27, an output winding 28 and a shift winding 29, the latter being driven by a common shift signal source with the winding 15, said source not being shown on the drawing.

In order to understand the basic functioning of the circuit of Figure 1 reference should be had to Figure 2. It is assumed that an input pulse is applied to the input winding 11 and this input pulse is polarized so as to switch the residual flux of the core 10 so that after the input pulse has been removed the residual flux will be in the positive region of saturation at the positive remnant point 30 on the B—H curve in Figure 2. As soon as a shift pulse is applied to the winding 14, the shift pulse will cause the flux in the core to move along the positive saturation portion of the B-H characteristic to the point 31 at which point the flux will rapidly switch to the opposite state in the negative region of saturation at 32 and will continue to be driven along in the negative saturation region of the characteristic defined by the saturation of the core. After the shift pulse is removed, the flux in the core will come back to the negative remnant point 34 on the B—H characteristic curve.

When the core is switched from the point 31 to 32 there is a large change of flux and as a result there is a relatively large output signal produced in the output winding 13 which is proportioned to this total flux. It should be noted that the flux variation in the output wave will actually be due to a flux change originating as the shift pulse moves the flux along the positive saturation region, from the point 30 to 31, said change being relatively small, the large change between points 31 and 32, and the further relatively small change resulting in the shift along the negative saturation region of the characteristic from the point 32.

If a subsequent shift pulse is applied to the winding 14 prior to the application of a further input pulse to the core 10, the flux in the core 10 will be changed by an amount representative of the slope of the saturated portion of the characteristic. Thus as the core is in a state of saturation, the flux will increase along the negative saturation line through the point 32 and beyond, depending upon the amplitude of the shift pulse, and then return to the point 34. It will be readily apparent that while the core is in a saturated state, the flux in the core will be changing and this flux change will produce a signal in the output winding 13.

Figure 3:
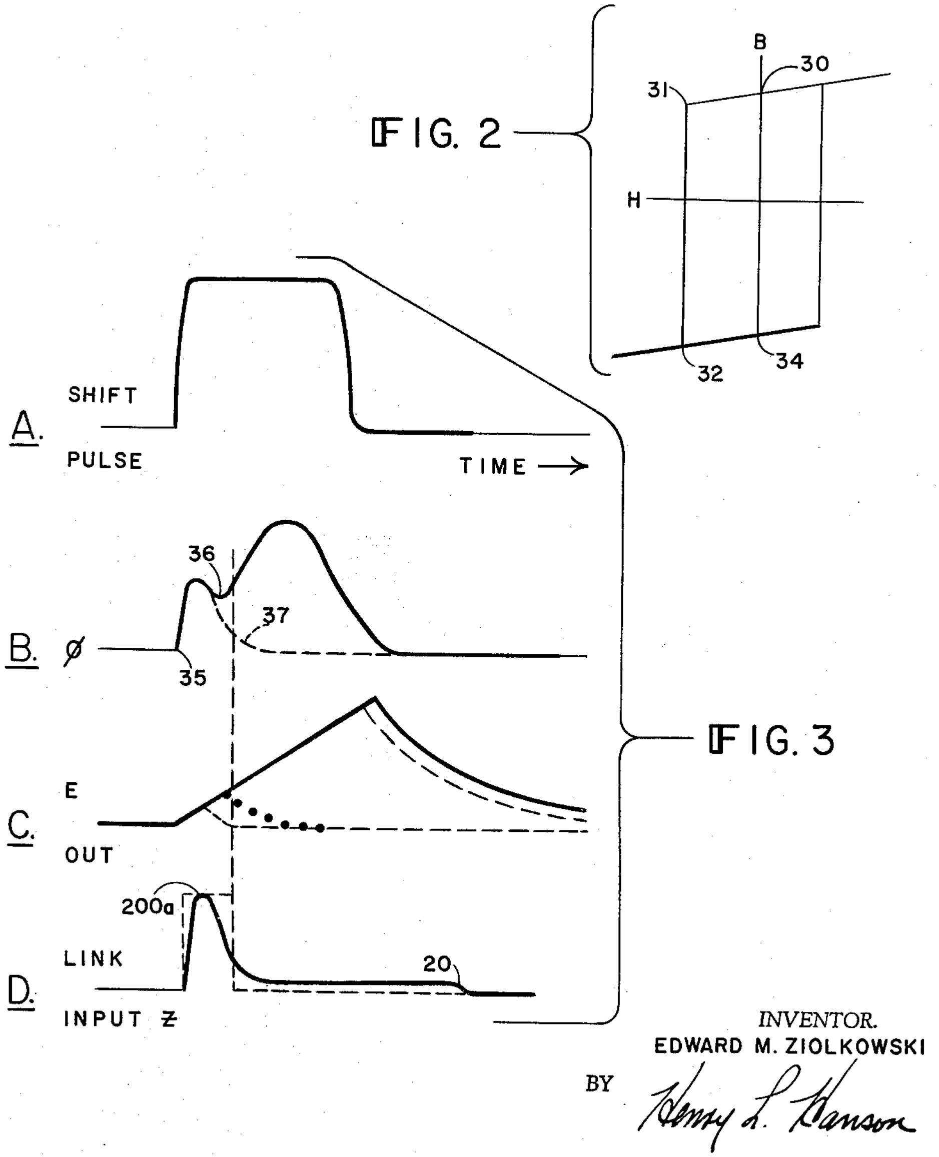
Figure 3 shows representative wave forms associated with the circuit of Figure 1.

Referring now to Figure 3, there is illustrated in Figure 3A a representative form of shift pulse which may be applied to the winding 14. The resultant flux change in the core is as illustrated in Figure 3B with the solid line curve representing, from point 35 to point 36, the change produced by movement along the saturated portion of the B—H characteristic. The remaining portion of the solid wave is the flux change resulting from a shift from the point 31 to the point 32 on the B—H curve. The dotted line portion 37 is representative of the terminating portion of the flux when the movement of the core has been in the negative saturated region along the saturation line which includes the points 34 and 32. Figure 3C illustrates the voltage induced in the output winding 13 with the solid line indicating the voltage wave form of the shift when the flux changes from point 30 to the point 34 in Figure 2, the dotted line indicating the output voltage in winding 13 when the shift in flux is along the domain wall defined by points 34 and 32 of Figure 2 without switching the core, and the dashed lines representing the modified output voltage resulting from a corresponding shift along the domain wall 34 and 32 when selected circuit components have been added to the input of the delay link, the latter acting in a manner to be described hereinafter.

As viewed in Figure 3C, it will be seen that the output voltage in the winding 13 for both a "zero" shift along the wall 32 and 34 and a "one" shift from 30 to 34 results in a "zero" signal having a magnitude which is a fairly large portion of the overall signal resulting from the "one." The feeding of this "zero" signal into the delay line will have the effect of tending to switch the subsequent core 25 or to adversely effect an input signal from the input winding 27 when a signal is being applied thereto. Consequently, it is desirable to eliminate that unwanted signal and at the same time produce substantially no change in the output signal resulting from a one shift from the core 10.

This is accomplished in the present invention by the incorporation of a frequency discriminating means or signal gating means which is effective to cause the initial portion of the flux change in the core 10 to be gated out insofar as its effect upon the output signal is concerned. The choke coil 21 functions in the capacity of a gating means in combination with the diode 20 and serves to substantially eliminate the effects of the zero flux change resulting from a movement of the saturation flux of the core 10 along its domain wall. The line input impedance, which includes the diode 20 and the coil 21, is represented by the curve illustrated in Figure 3D. It will be seen that upon the initial flux change in the core that the input impedance looking into the entire coupling link including diode 20, coil 21, and line 15 is relatively high and that after the initial portion of the flux change and output voltage has been passed, the impedance will drop down to a substantially constant value where it will remain until such time as the signal has been passed. Ideally, the impedance characteristic would remain infinite for that period of time when the adverse effects of the "zero" signal shift are present. The diode 20 and the coil 21, however, have been found to function adequately with regard to this initial high impedance and thereby minimizes the initial current flow into the condenser 16 on the input of the delay line 15.

The output voltage illustrated in Figure 3C will be changed in accordance with the dashed lines both for the "zero" and for the "one's" output voltage. It will be readily apparent that the ratio of the output voltage due to a "one" with respect to a "zero" will be much greater after the link input impedance has been added to the circuit. Since the ratio is considerably larger it will be apparent that the resultant signal to noise ratio in the circuit will be improved.

With the addition of the choke 20 on the input of the delay link, the only signal that will have a substantial effect on the core 25 by way of the input winding 26 will be that when the core 10 has been shifted from a "one" state to the "zero" state. Consequently, it will be possible to effect a higher degree of logical control on the core 25 with the application of input signals from the input winding 25. This greatly enhances the usability of this type of circuit particularly where more than one input signal is to be applied to a subsequent core.

It will be readily apparent that the choke coil is only one of several possible elements that could be utilized on the input of the delay link 15. The important feature is that one or more elements be used in a configuration which will gate out or discriminate against the initial portion of a flux change in the core 10 resulting from a change in the saturation portion of the core or a change along the domain wall of its B—H characteristic.

In one embodiment of the present invention, the choke coil 21 had an inductance of 75 microhenries while the inductance of the inductor 18 was 2.5 millihenries.

Figure 4:
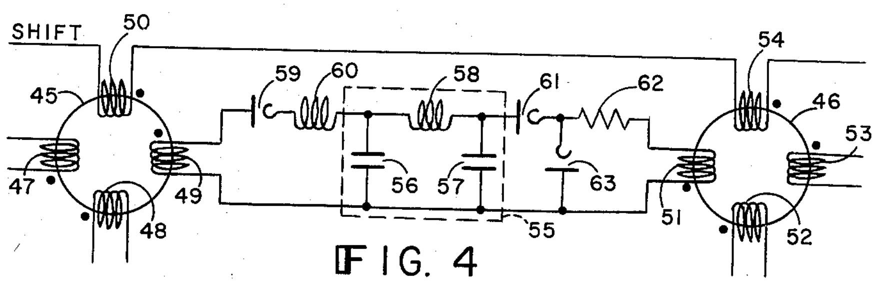
Figure 4 illustrates schematically a modified form of the present invention incorporating the novel output circuit for the delay link.

Referring now to Figure 4, there is here illustrated a further modified form of the present invention utilizing additional electrical elements for improving the signal coupling characteristics between a pair of magnetic cores. This modified form of the circuit incorporates not only the signal gating means on the input of the delay link but an additional signal isolating means on the output of the delay link.

More specifically, the circuit of Figure 4 includes a pair of magnetic cores 45 and 46, both of which are of the type illustrated and described in connection with Figure 1. The core 45 has a pair of input windings 47 and 48, an output winding 49, and a shift winding 50. The core 46 has an input winding 51, a further input winding 52, an output winding 53, and a shift winding 54. The coupling between the output winding 49 and the input 51 is by way of a delay link 55, the latter comprising a condenser 56, a condenser 57 and an inductor 58. Connected in series with the input lead of the link 55 is a diode 59 and a choke 60. Connected in series with the output of link 55 is a diode 61 and a resistor 62. A further diode 63 is connected in shunt across the output of the link 55.

In considering the operation of the circuit of Figure 4, it should be noted that the basic operation will be the same as that discussed in Figure 1. That is if a "one" has been stored in the core 45 this signal will be shifted out of the core upon an application of a shift pulse to the winding 50 and will be shifted into the delay link 55 and propagate therealong to the input winding 51 to the core 46. As the pulse from the output propagates through the link 55, it will reach the diode 61 and the diode will begin to conduct. However, initially the diode 61 will have a relatively high impedance which will result in the voltage on the output condenser 57 building up before the diode 61 breaks down to its low resistance region.

Figure 6:
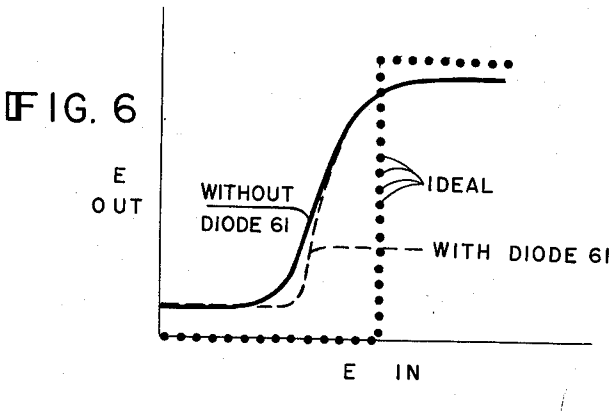
Figure 6 illustrates wave forms related to the functioning of the circuits of Figures 4 and 5.

The relationship between the input voltage applied to the delay link and the output voltage therefrom applied to the winding 51 is illustrated in Figure 6. The solid line curve of Figure 6 illustrates the normal input-output voltage characteristic of a coupling circuit of the type illustrated in Figure 1. The dotted line curve in Figure 6 represents the ideal relationship between this input and output voltage and it will be noted that this is a rectangular type switching relationship which, after the input voltage has reached a predetermined point, results in the output voltage rapidly switching to its desired value. The dashed curve in Figure 6 represents the characteristics achieved by the addition of the diode 61. It will be readily apparent that because of the initially high impedance of the diode that the output voltage will not increase as rapidly as it would if the diode were not in the circuit. Further, the voltage characteristic tends to approach the ideal characteristic illustrated by the dotted curve. This circuit configuration then has a further signal discriminating characteristic which will tend to retard the switching of the core unless the voltage on the input is greater than a desired minimum.

The diode 61 further acts as a high impedance in the event that a positive pulse should be induced into the input winding 51 due to a shifting of the core 46 by subsequent shift pulses on the shift winding 54.

In order to minimize the kickback into the delay link 55 when the core 46 is set, said kickback resulting in a negative voltage appearing on the upper portion of the winding 51, the diode 63, resistor 62 and diode 61 will all serve to minimize the effective signal reflected into the condenser 57. The resistor 62 and the diode 63 form a voltage divider with the diode 63 having a relatively low impedance across the feed back circuit thereby tending to shunt out the signals. In addition, the impedance of the diode 61 will be arranged to combine with the impedance of the condenser 57 to form a further voltage divider with the ratio of impedance of the latter two elements being such as to further decrease the net signal fed back to the condenser 57.

It will be apparent that the circuit of Figure 4 acts in a dual manner to minimize the tendency for unwanted signals to be fed through the delay link into the subsequent core of the circuit. This further enhances the usability of the circuit in a logical network wherein a number of input windings may be present for controlling the setting of the core.

Figure 5:
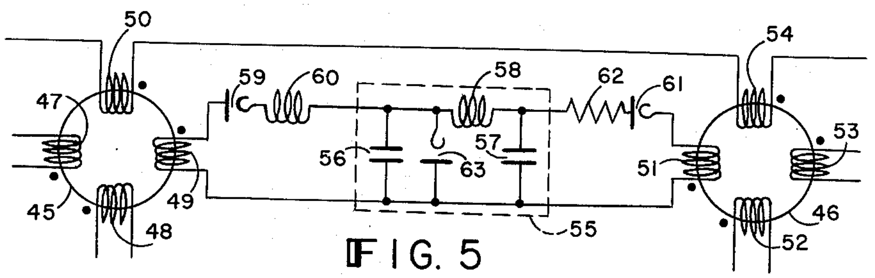
Figure 5 illustrates schematically a further modified form of the present invention.

The circuit of Figure 5 is basically the same as that of Figure 4 except that in this particular embodiment, the position of the shunt diode used to provide a shunt path for kickback signals has been moved to a point where the inductance in the delay line will serve as a further impedance tending to block the flow of inverse signal.

More specifically the circuit is comprised of the same basic elements as the circuit of Figure 4 and corresponding components carry corresponding reference characters. The only basic change is that the diode 63 is now connected in shunt with the condenser 56 and there is no corresponding diode shunted across the output terminals of the delay link 55. The placing of the diode 63 in shunt with the condenser 56 establishes a slightly modified impedance circuit which in effect will comprise a series circuit traceable from the upper terminals of the windings 51 through the diode 61, resistor 62, choke 58 and diode 63, back to the lower terminal of the coil 51. This diode 63 will thus be one impedance element of a number of series elements with a resultant minimum of voltage appearing across diode 63. This circuit thus forms modified feed back signal reducing circuit.

In other respects the circuit of Figure 5 functions the same as the circuit of Figure 4 with the diode 61 serving to improve the switching relationship of the input and output voltages as illustrated in Figure 6.

While, in accordance with the provisions of the statutes, there has been illustrated and described the best forms of the invention known, it will be apparent to those skilled in the art that changes may be made in the apparatus described without departing from the spirit of the invention defined by the claims and that in some cases, certain features of the invention may be used to advantage without a corresponding use of other features.

Having now described the invention, what is claimed as new and novel and for which it is desired to secure by Letters Patent is:

1. An electrical magnetic core circuit for manipulating direct current digital signal pulses comprising a pair of bistable magnetic cores each having a substantial residual flux with a coupling link connected between adjacent cores where said link comprises a time delay circuit having a pair of input terminals whose input impedance is relatively low at the normal operating frequencies of said circuit and which is adapted to be connected to an output winding of the input core of said pair of cores, and a pair of output terminals adapted to be connected to an input winding of the output core of said pair of cores, said delay circuit including a condenser connected directly between said pair of input terminals, a diode, an electrical impedance element comprising a choke coil whose impedance is relatively high for high frequency signals when compared with said input impedance, and means connecting said diode and said impedance element in series with one of the input terminals so that said impedance element will block the initial direct current output of the input core to prevent the flow of current into said condenser and thereby to increase the signal-to-noise ratio on the input of said time delay circuit.

2. An electrical circuit for manipulating direct current pulse signals comprising a first bistable magnetic core, a second bistable magnetic core, both of said cores having a substantial residual flux, an input winding on both of said cores, an output winding on both of said cores, a shift winding on both of said cores, and a coupling link connecting the output winding of the first of said cores to the input winding of the second of said cores, said coupling link comprising an L—C delay network having a pair of input terminals and a pair of output terminals, a diode, a choke whose impedance is high when compared to the input impedance of said input terminals at the operating pulse repetition rate of said circuit, means connecting said diode and said choke in series with one of the input terminals of said delay network so that said choke will block the initial output signal from the output winding of said first core, a resistor, and means connecting said resistor in series with one of the output terminals.

3. An electrical circuit for manipulating electrical signal pulses comprising a pair of bistable magnetic cores each having a substantial residual magnetic flux and input and output windings, a shift winding wound on one of said cores and adapted upon application of a shift pulse thereto to switch the magnetized state of said core from a first bistable state to a second state so that the output winding of said core will have a signal pulse induced therein, a signal time delay link, means connecting said link between the output winding of said one core and the input winding of the other core to couple the signal pulses in said output winding of said first core to said other core input winding, and signal gating means connected to the input of said link to block the initial flow of each signal pulse into said link produced by the initial flux changes in said one core initiated by each shift pulse.

4. An electrical circuit as claimed in claim 3 wherein said signal time delay link comprises an L—C delay network and said signal gating means comprises a high-frequency signal gating choke, a resistor, a diode, and means connecting said resistor and said diode in a series circuit between said delay link and the input winding of said other core.

5. An electrical circuit as claimed in claim 4 wherein said L—C delay network comprises a pair of input terminals having a first condenser connected thereacross, a pair of output terminals having a second condenser connected thereacross, and an inductor having an impedance less than said gating choke connected between said condensers.

6. An electrical circuit as claimed in claim 5 wherein a diode is connected in shunt with one of said condensers.

7. An electrical circuit as claimed in claim 5 wherein a diode is connected in shunt with said first condenser.

8. An electrical circuit as claimed in claim 6 wherein said diode is connected in a circuit to shunt said second condenser.

References Cited in the file of this patent

UNITED STATES PATENTS

| | | |
|---|---|---|
| 2,652,501 | Wilson | Sept. 15, 1953 |
| 2,697,178 | Isborn | Dec. 14, 1954 |

OTHER REFERENCES

EPSCO 2000 Series: Magnetic Storage Elements, 38 pages (pages 5 to 9, Fig. 4, and DS 7—4 are relied upon), published July 15, 1954, by EPSCO Inc.